(12) United States Patent
Vaupot et al.

(10) Patent No.: US 12,150,582 B2
(45) Date of Patent: Nov. 26, 2024

(54) STEAM COOKING APPARATUS AND METHOD

(71) Applicant: KONINKLIJKE PHILIPS N.V., Eindhoven (NL)

(72) Inventors: Jan Vaupot, Slovenj Gradec (SI); Florian Krall, Klagenfurt (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/284,805

(22) PCT Filed: Nov. 11, 2019

(86) PCT No.: PCT/EP2019/080899
§ 371 (c)(1),
(2) Date: Apr. 13, 2021

(87) PCT Pub. No.: WO2020/099339
PCT Pub. Date: May 22, 2020

(65) Prior Publication Data
US 2022/0000299 A1   Jan. 6, 2022

(30) Foreign Application Priority Data
Nov. 15, 2018 (EP) .................................... 18206540

(51) Int. Cl.
*A47J 27/04* (2006.01)
*A23L 5/10* (2016.01)
(Continued)

(52) U.S. Cl.
CPC ............... *A47J 27/04* (2013.01); *A23L 5/13* (2016.08); *A47J 27/004* (2013.01); *F22D 5/26* (2013.01);
(Continued)

(58) Field of Classification Search
CPC .......... A47J 27/004; A47J 27/04; A47J 27/08; A47J 27/0802; A47J 27/0804; A47J 27/16;
(Continued)

(56) References Cited

U.S. PATENT DOCUMENTS 4,876,426 A   10/1989 Smith
8,420,983 B2   4/2013 Ohashi
(Continued)

FOREIGN PATENT DOCUMENTS

CN   103782104   5/2014
CN   104146190   11/2014
(Continued)

OTHER PUBLICATIONS

International Search Report and Written Opinion Dated Feb. 12, 2020 For International Application No. PCT/EP2019/080899 filed Nov. 11, 2019.
(Continued)

*Primary Examiner* — Hung D Nguyen
(74) *Attorney, Agent, or Firm* — Maschoff Brennan

(57) ABSTRACT

A cooking apparatus is for cooking using steam, but which makes use of heated steam above 100 degrees Celsius. This heated steam is circulated around the food chamber.

13 Claims, 4 Drawing Sheets

(51) Int. Cl.
   *A47J 27/00* (2006.01)
   *F22D 5/26* (2006.01)
   *F24C 15/32* (2006.01)
   *A47J 36/32* (2006.01)

(52) U.S. Cl.
   CPC .......... *F24C 15/32* (2013.01); *A23V 2002/00* (2013.01); *A47J 2027/043* (2013.01); *A47J 36/32* (2013.01)

(58) Field of Classification Search
   CPC ...... A47J 2027/043; A47J 36/04; A47J 36/16; A47J 36/32; F24C 15/22; F24C 15/24; F24C 15/32; F24C 15/325; F24C 15/327; F22D 5/26; A23L 5/13; A23L 5/15; A23L 5/17; A23V 2002/00
   USPC ....... 219/391, 393, 395, 400, 401, 402, 678, 219/682
   See application file for complete search history.

(56) References Cited

U.S. PATENT DOCUMENTS

| | | | | |
|---|---|---|---|---|
| 10,412,982 | B2* | 9/2019 | Tanaka | A23L 7/113 |
| 2011/0168690 | A1* | 7/2011 | Tomomura | A21B 3/04 |
| | | | | 219/401 |
| 2012/0199110 | A1* | 8/2012 | Shaffer | F24C 15/327 |
| | | | | 126/1 R |
| 2015/0359047 | A1* | 12/2015 | Kishimoto | F24C 7/085 |
| | | | | 219/704 |
| 2017/0010005 | A1 | 1/2017 | Tomoda | |
| 2017/0164778 | A1* | 6/2017 | Utsumi | F22B 1/285 |
| 2017/0245683 | A1 | 8/2017 | Chen | |
| 2018/0035698 | A1 | 2/2018 | McNerney | |
| 2018/0132648 | A1 | 5/2018 | Furlanetto | |
| 2018/0289212 | A1 | 10/2018 | Sladecek | |
| 2018/0359823 | A1* | 12/2018 | Shin | H05B 6/6485 |

FOREIGN PATENT DOCUMENTS

| | | |
|---|---|---|
| JP | 5025308 | 9/2012 |
| KR | 101120397 | 4/2012 |
| WO | 2018007218 | 1/2018 |

OTHER PUBLICATIONS

International Preliminary Report on Patentability Dated Dec. 23, 2020 For International Application No. PCT/EP2019/080899 filed Nov. 11, 2019.

Written Opinion of the International Preliminary Examining Authority Dated Oct. 2, 2020 for International Application No. PCT/EP2019/080899 filed Nov. 11, 2019.

* cited by examiner

STEAM COOKING APPARATUS AND METHOD

CROSS REFERENCE TO RELATED APPLICATIONS

This application is the U.S. National Phase application under 35 U.S.C. § 371 of International Application No. PCT/EP2019/080899 filed Nov. 11, 2019, which claims the benefit of European Patent Application Number 18206540.9 filed Nov. 15, 2018. These applications are hereby incorporated by reference herein.

FIELD OF THE INVENTION

This invention relates to a steam cooker (also referred to as a steamer) and steam cooking method.

BACKGROUND OF THE INVENTION

Steam cooking (also referred to as steaming) is commonly known as one of the healthiest cooking methods. In particular, steam cooking is often preferred over other cooking methods such as boiling, frying and baking because it results in a lower amount of nutrient destruction.

This is because steam cooking operates at a lower temperature, below 100 degrees Celsius, but nevertheless enables short cooking times due to the wet steam environment. The presence of water as the cooking medium causes a leaching out of water soluble nutrients when boiling, and this is greatly reduced by steam cooking.

However, steam cooking has some disadvantages, such as steamed up viewing windows making it difficult to inspect the cooking process, possible soggy food consistency, and a dripping wet cooking chamber after cooking. The soggy consistency results because wet steam condensates and deposits water droplets on the food surface, and the food absorbs the water. As a result, there can be a gain of food weight of up to 10% and a deterioration of taste quality.

There is a need for a steam cooking process which maintains the nutritional advantages but avoids one or more of these problems.

US 2018/132648 A1 discloses a cooking vessel for an oven cavity of a cooking oven.

US 2018/289212 A1 discloses an apparatus and method for preparing food ingredients with hot air and fluid introduced into the hot air.

SUMMARY OF THE INVENTION

The invention is defined by the claims.

According to examples in accordance with an aspect of the invention, there is provided a cooking apparatus, comprising:
  a food chamber;
  a heating arrangement;
  a water reservoir;
  a circulation system; and
  a controller,
  wherein the controller is adapted to control the heating arrangement to heat water from the water reservoir to create steam, and to further heat the steam to create heated steam at a temperature in the range 100 to 120 degrees Celsius, preferably 110 to 120 degrees Celsius, and to control the circulation system to circulate the heated steam around the food chamber.

This cooker performs cooking using steam heated above 100 degrees Celsius. This steam is relatively dry (even when close to the maximal humidity level that is possible at the elevated temperature). The heated steam is circulated rather than being provided as a continuous delivery of new steam. This means the steam in part performs a drying function. The result is shorter cooking times than a conventional steam cooker and also increased nutrient retention because the nutrients are not washed away by large amounts of water used in the cooking process. In particular, washing out of water-soluble vitamins is reduced. The temperature is below an upper limit to prevent burning so that the cooking process remains a water-based process which does not excessively dry out the food. The end result is improved taste and texture compared to a normal steam cooking process. The apparatus can be used for vegetables, which then retain a crunchiness as well as retaining nutrients, or for other food items such as fish and other protein rich foods. The condensing of steam on the food is still the main energy transfer mechanism to heat up the food, but the amount of water on the food is far less than with standard steam cooking.

The surfaces of the cooking chamber can be maintained above the dew point at the operating temperature, pressure and humidity level, so that no condensation at a surface of the cooking chamber (such as a viewing window) takes place.

A side effect of the circulation of saturated air at an elevated temperature (such as 120 degrees Celsius) compared to wet steam at around 100 degrees Celsius is that the heat transfer rate to food due to condensation and convection is increased. As a result, the time to cook the food is decreased compared to standard steam cooking.

The apparatus thus gives the advantages of a steam cooking process without the disadvantages.

The apparatus may further comprising a water dosing system for delivering water to the heating arrangement, wherein the controller is adapted to control the water dosing system and the heating arrangement to maintain an environment of heated steam in the temperature range.

A continuous or pulsed delivery of water and a cyclic control of the heating arrangement may for example be used to maintain the temperature in the desired range.

The heated steam preferably has an absolute humidity level greater than 450 g/m$^3$. This is a relatively dry cooking environment compared to a conventional steam cooker. Note that the relative humidity has a maximum of around 50% and the absolute humidity has a maximum of around 550 g/m$^3$ at 120 degrees Celsius and atmospheric pressure. Thus, for a 120 degree Celsius operating temperature, the absolute humidity will be in the range 450 to 550 g/m$^3$.

The humidity level depends on the water delivery rate and the heating power. When the maximum humidity is reached at a given temperature and pressure, excess steam may be allowed to leak through leakage vents. Thus, the desired humidity conditions are met by maintaining a maximal humidity for the particular operating temperature and pressure.

The temperature of the circulating flow of air/steam is for example monitored using an NTC (negative temperature coefficient) temperature sensor. The temperature at the middle of the food chamber (e.g. in a food basket) is regulated to be at the desired temperature, such as 120 degrees Celsius, and this is regulated by switching on and off the air/steam heater. Note that the monitored temperature does not have to be the temperature being regulated, it may instead be a temperature which is correlated with the temperature being regulated.

The airflow is defined by the circulation system such as a motor speed and fan dimensions.

The apparatus may comprise a transparent viewing window into the food chamber. The relatively dry environment means condensation is reduced or prevented so that inspection of the food can take place during cooking. The transparent viewing window is for example formed in an openable lid of the food chamber.

The heating arrangement may comprise a first heater for heating the water and a second heater for heating the steam. By using two heaters, each can be optimized for its function. One is for the generation of steam (at 100 degrees Celsius) and the other is for heating the circulatory flow to a higher temperature.

The circulation system is for example adapted to circulate a flow past the second heater. The second heater thus delivers heat to compensate for heat losses during the cooking.

A feed arrangement may be provided for providing water from the water reservoir into contact with a heated surface of the first heater. This surface is then used to induce evaporation.

The controller may be adapted to control the heating arrangement such that an initial rise in the temperature of the whole food chamber to a temperature of 100 degrees Celsius takes less than 2 minutes.

This rapid initial heating minimizes enzymatic reactions, i.e. providing fast enzyme deactivation, as well as contributing to a shorter cooking time. Preferably, the time taken for the food to reach 70 degrees Celsius is less than 6 minutes.

The invention also provides a cooking method, comprising:
receiving food to be cooked in a food chamber;
heating water from a water reservoir to create steam;
further heating the steam to create heated steam at a temperature in the range 100 to 120 degrees Celsius, preferably 110 to 120 degrees Celsius; and
circulating the heated steam around the food chamber.

The method may further comprise controlling a delivery of water from the water reservoir to a heating arrangement and controlling the heating arrangement thereby to maintain an environment of heated steam in the temperature range. The heated steam may be generated with an absolute humidity level greater than 450 $g/m^3$.

In one example, the water is heated with a first heater and the steam is heated with a second heater. The heated steam is for example circulated past the second heater.

The method may comprise controlling the heating arrangement such that an initial rise in the temperature of the whole food chamber to a temperature of 100 degrees Celsius takes less than 2 minutes.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
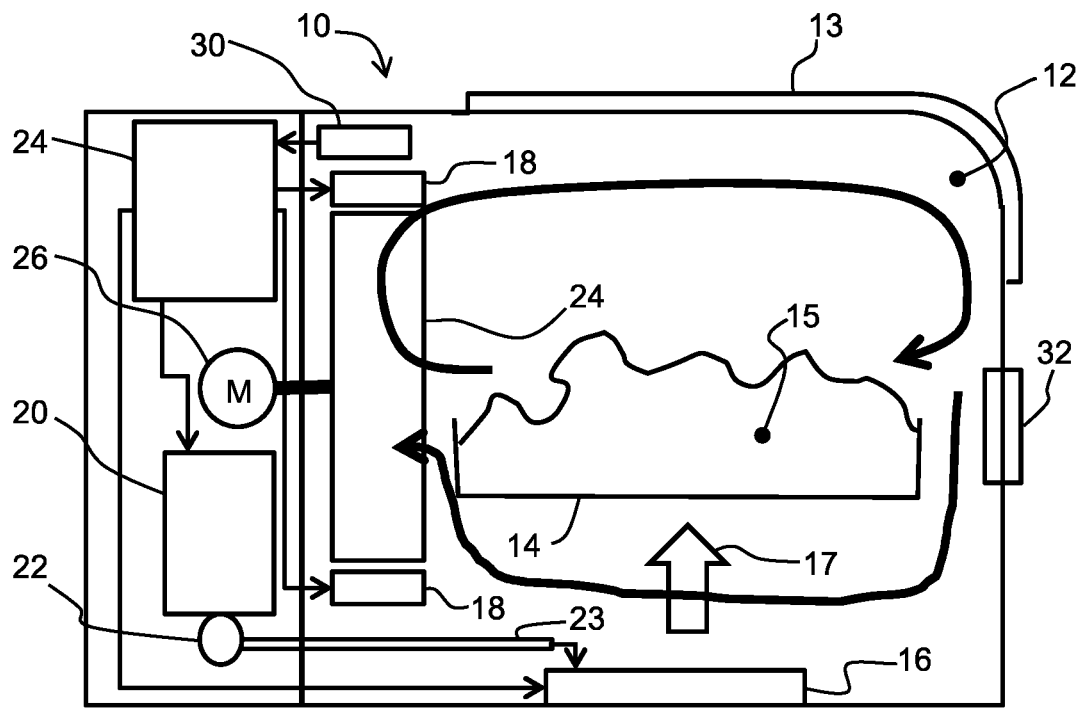
FIG. 1 shows a a cooking apparatus.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a cooking apparatus for cooking using steam, but which makes use of heated steam above 100 degrees Celsius. This heated steam is circulated around the food chamber.

FIG. 1 shows a a cooking apparatus 10, comprising a food chamber 12 in which a food basket 14 is mounted. The food chamber has a viewing window 13 which may also be the openable lid of the apparatus. Food 15 to be cooked is placed on the food basket which then places the food near the center of the food chamber. The food basket has air permeable side walls and optionally an air permeable base so that air and steam can circulate through the basket to the food.

There is a heating arrangement which in this example comprises a first heater 16 and a second heater 18. The first heater is used to generate steam (shown as arrow 17) from water which is delivered from a water reservoir 20 by a dosing system 22. The dosing system provides water to a feed arrangement 23 which delivers water to a surface of the first heater 16 to generate steam.

The dosing system may deliver a constant flow of water during cooking or a regularly pulsed delivery of water (so needing no feedback control), but it could also be controlled dynamically during cooking using feedback from a humidity sensor.

A circulation system is provided in the form of a fan 24 and motor 26. The circulation system circulates the steam generated by the first heater 16 around the food chamber. The second heater 18 is along the circulation path and thereby further heats the steam to create a high temperature dry steam environment. The circulation system thus moves the saturated air inside the chamber to the food to increase convection and also assists in producing a homogeneous temperature field of all parts inside the cooking chamber, including the viewing window. This is to avoid condensation.

The apparatus is controlled by a controller 28, which controls the heating arrangement 16, 18 and optionally also the dosing system 22. The controller receives temperature information from a temperature sensor 30. The temperature of interest is the temperature at the center of the food chamber, where the food is located. However, the temperature sensor, which may be a negative temperature coefficient (NTC) temperature sensor, may be located anywhere in the food chamber, with a known correlation between the temperature at the sensor location and the temperature in the middle of the chamber.

The temperature is regulated by switching on and off the second heater 18 of the heating arrangement by the controller. The temperature of the first heater, for steam generation, is regulated by a thermostat again by cycling on and off. These two control mechanisms may be independent.

The cooking chamber is vented to the ambient surroundings by vents 32. Thus, the cooking chamber remains at substantially atmospheric pressure during use.

The controller 28 controls the heating arrangement to heat water from the water reservoir to create steam using the first heater 16, and to further heat the steam to create heated steam at a temperature in the range 100 to 120 degrees Celsius, preferably 110 to 120 degrees Celsius. The circulation system circulates the heated steam around the food chamber.

This cooker thus performs cooking using steam heated above 100 degrees Celsius for example at 115 to 120 degrees Celsius, such as 120 degrees Celsius. The temperature is below an upper limit to prevent burning of the food, and so that the cooking process remains a water-based process which does not excessively dry out the food.

Figure 2:
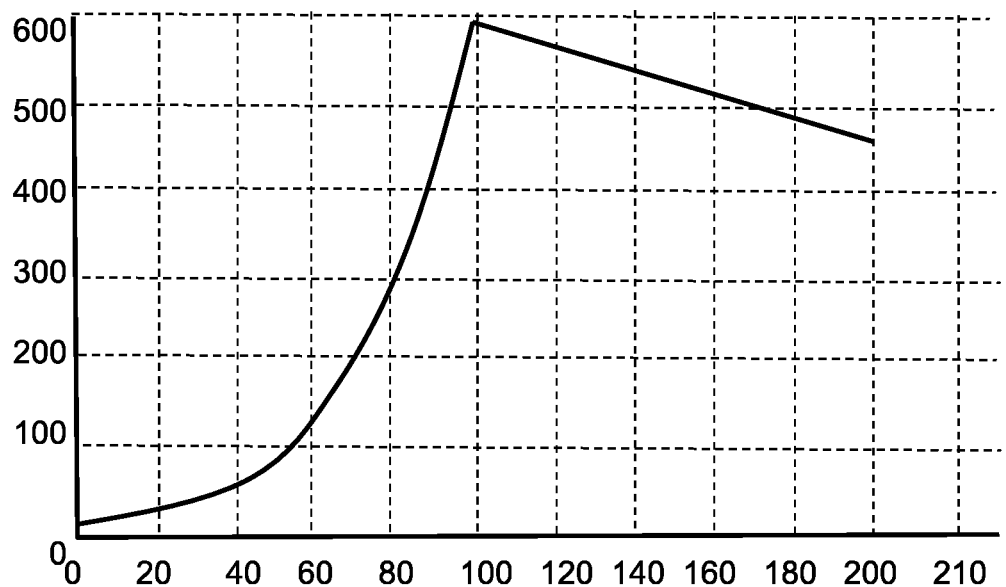
FIG. 2 shows the absolute humidity of steam at ambient pressure as a function of temperature.

This steam is relatively dry even when close to the maximal humidity level that is possible at elevated temperatures such as 120 degrees Celsius. This is explained with reference to FIG. 2 which shows the absolute humidity in $g/m^3$ (y-axis) of steam at ambient pressure as a function of temperature in degrees Celsius (x-axis). There is a maximum humidity of around 570 $g/m^3$ at 100 degrees Celsius, after which there is a decrease. Thus, at elevated temperatures, the absolute humidity drops. At 120 degrees Celsius, the maximum is around 550 $g/m^3$. The heated steam preferably has an absolute humidity level greater than 450 $g/m^3$ since the water content remains the medium for transferring heat. The relative humidity has a maximum of around 50% at 120 degrees Celsius and atmospheric pressure.

The humidity level depends on the water delivery rate and the heating power. The vents of the cooking chamber maintain the pressure at ambient pressure, and thus steam can escape when the maximum absolute humidity is reached, which would otherwise result in an increase in pressure.

The vents are designed to avoid an overshoot of humidity and pressure in the cooking chamber. The maximum humidity corresponds to a saturated gas environment in which there is only overheated steam which will condense only on the food to transfer heat, since only the food is below the dew point. The food is thus heated by the latent heat, and the gaseous steam heats up the food by convection heat transfer and dries the food again. The cooking effect is thus different for dry steam than for wet steam as used in a standard steam cooker.

The release mechanism provided by the vents means that the steam delivery rate does not need to be controlled, and instead there can be a preset water delivery rate to the first heater 16. The controller may for example implement a control sequence which determines particular points of time when steam generation starts and/or ends.

When the apparatus is started from cold, the time at which steam generation starts is important to ensure condensation is avoided. Condensation will result if the transparent window is below the dew point, but the food will become dry if steam generation starts too late.

The water pump may also be switched off (so that steam generation is stopped) some time (such as one or a few minutes) before the end of the cooking time to avoid wet food results.

However, in other examples, the water delivery rate may be controlled for example to have more accurate control of the humidity.

The heated steam is circulated rather than being provided as a continuous delivery of new steam. The condensing of steam on the food is still the main energy transfer parameter to heat up the food, but the amount of water on the food is far less than with standard steam cooking. Furthermore, the heat transfer density to food due to condensation and convection is increased compared to conventional steam cooking so that the time to cook the food is decreased. The result is shorter cooking times than a conventional steam cooker and also increased nutrient retention because the nutrients are not washed away by large amounts of water used in the cooking process. In particular, washing out of water-soluble vitamins is reduced.

The end result is improved taste and texture compared to a normal steam cooking process.

The surfaces of the cooking chamber are above the dew point at the temperature, pressure and humidity level used, so that no condensation at a surface of the cooking chamber, such as the transparent viewing window 13, takes place. The viewing window has increased heat losses compared to isolated wall so it is desirable for the window to be exposed to the flow created by the circulation system to maintain the viewing window above the dew point.

In addition to preventing the loss of soluble nutrients, it is desirable to provide fast deactivation of enzymes. This can be achieved by providing sufficient heating power and by controlling the heating arrangement such that an initial rise in the temperature of the whole food chamber to a temperature of 100 degrees Celsius takes less than 2 minutes. This rapid initial heating preferably enables the food to reach 70 degrees Celsius in less than 6 minutes.

Figure 3:
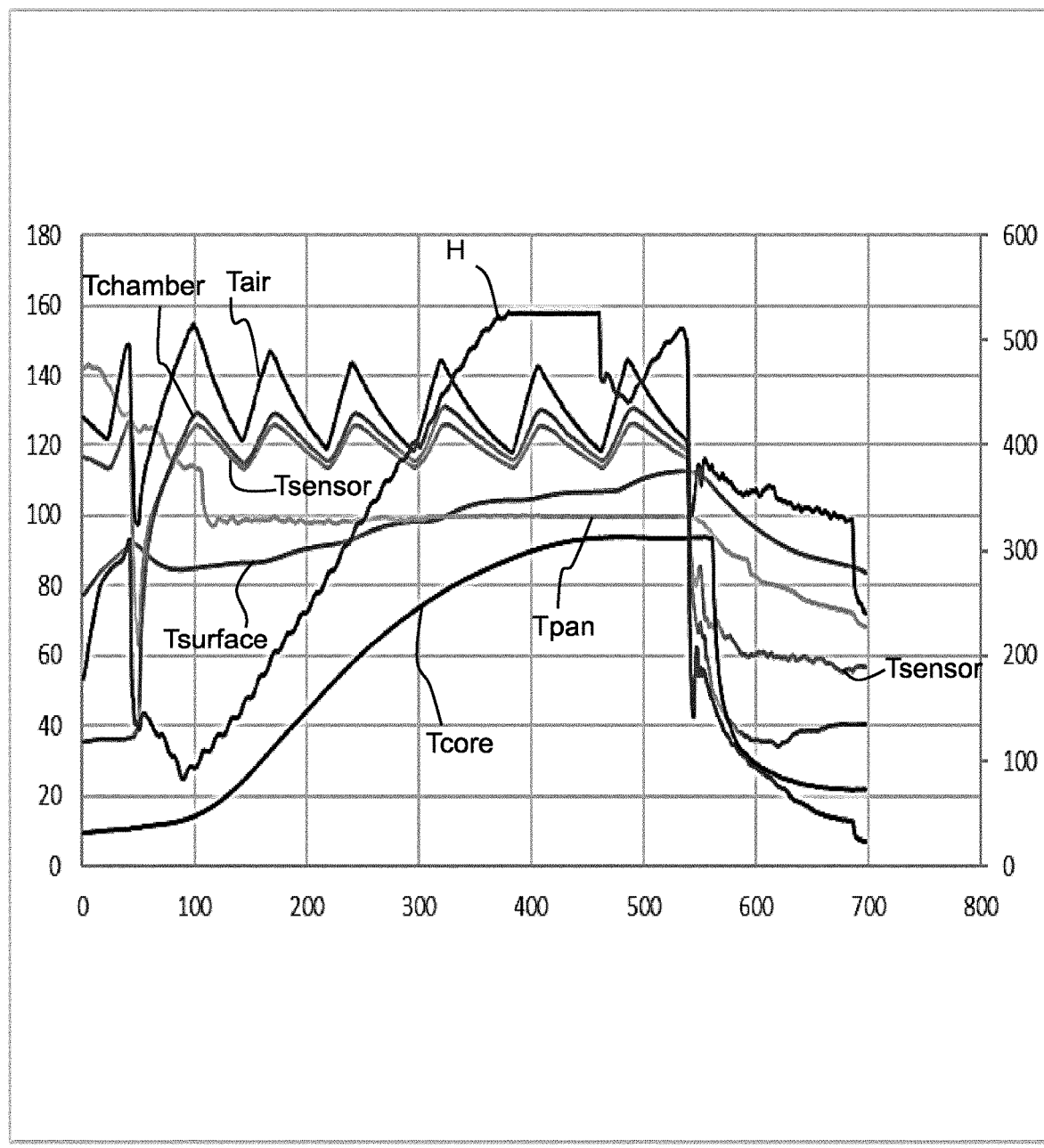
FIG. 3 shows the evolution of various temperatures, and absolute humidity during a cooking process from a hot start.

FIG. 3 shows the evolution of the temperature of the air in the middle of the chamber Tchamber, the temperature at the steam generation heater pan Tpan, the temperature of the air where it leaves the heater and enters the cooking chamber Tair, the temperature of the middle of the food, Tcore, the sensor temperature Tsensor which is positioned on the wall of the chamber, the food surface temperature Tsurface and the absolute humidity H during a cooking process of inserting 350 g of fresh Broccoli. The humidity axis is the right y-axis ($g/m^3$) and the temperature axis is the left y-axis (degrees Celsius).

As can be seen, the chamber temperature cycles due to the cyclic operation of the heater, which generates a corresponding (but higher) cyclic temperature Tair of the air provided to the chamber.

In this case, a hot start was used with the device preheated before the insertion of food. The heater pan has thus already stabilized its temperature at 100 degrees.

The data shows that the humidity level corresponding to full saturation is reached even after 6 minutes. This comes about because the humidity directly causes heating of the cold food and condenses on the cold food surface while the food heats up. After the food surface reaches the dew point, the effect stops, and the humidity in environment reaches the maximum of around 560 $g/m^3$ and convection heat transfer is predominantly used to cook the food.

Figure 4:
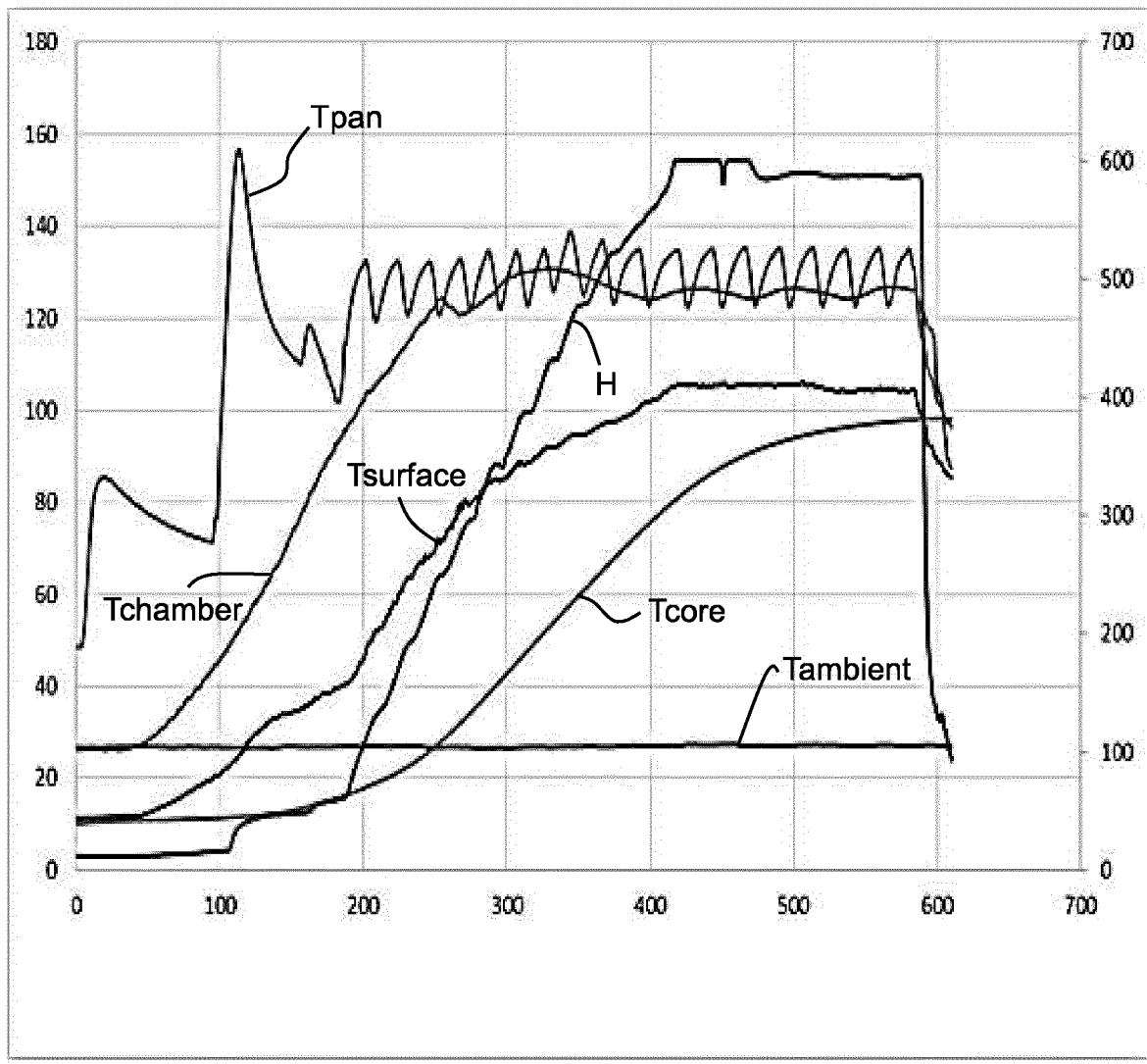
FIG. 4 shows the evolution of various temperatures, and absolute humidity during a cooking process from a cold start.

FIG. 4 shows sensor data of a cooking process (again 350 g Broccoli) with a cold start. Some of the same plots are shown as in FIG. 3, in particular the temperature of the air in the middle of the chamber Tchamber (i.e. in the middle of the cooking basket), the temperature at the steam generation heater pan Tpan, the temperature of the middle of the food Tcore, the food surface temperature Tsurface and the absolute humidity H. The ambient temperature is also shown. The humidity axis is again the right y-axis (g/m³) and the temperature axis is the left y-axis (degrees Celsius).

Initially, for the first 100 seconds, only the fan and the second heater 18 heat up the cooking chamber and food. The viewing window heats up faster than the food because the flow of the second heater and blower are directed onto the viewing window. After the pre-heating period as implemented by the controller, the first heater (which forms a steam cooker pan) starts to generate steam and the cooking process continues as explained above.

Figure 5:
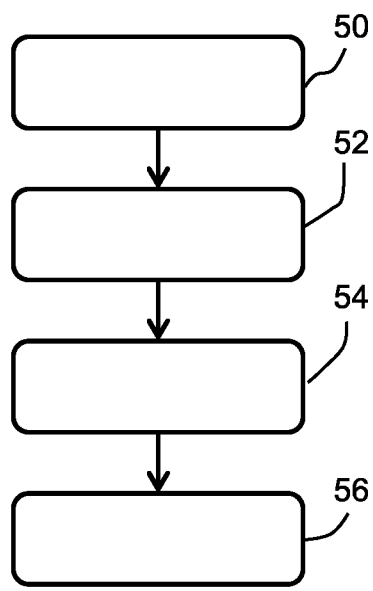
FIG. 5 shows a cooking method.

FIG. 5 shows a cooking method, comprising:

in step 50, receiving food to be cooked in a food chamber;

in step 52, heating water from a water reservoir to create steam;

in step 54, further heating the steam to create heated steam at a temperature in the range 100 to 120 degrees Celsius, preferably 110 to 120 degrees Celsius; and in step 56 circulating the heated steam around the food chamber.

The example above makes use of two heaters, but there could be a single heater for generating steam and for heating the circulatory flow.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A cooking apparatus, comprising:
    a food chamber;
    a heating arrangement;
    a water reservoir;
    a circulation system; and
    a controller,
    wherein the controller is adapted to control the heating arrangement to heat water delivered, during cooking, from the water reservoir to create steam, and to further heat the steam to create heated steam at a temperature in the range 100 to 120 degrees Celsius, and to control the circulation system to circulate the heated steam around the food chamber,
    wherein the heated steam has an absolute humidity level greater than 450 g/m³, and
    wherein temperature at a surface of the food chamber is maintained above a condensation temperature of the steam.

2. The apparatus as claimed in claim 1, wherein the controller is further adapted to control the heating arrangement to maintain an environment of the heated steam in the temperature range.

3. The apparatus as claimed in claim 1, further comprising a transparent viewing window into the food chamber.

4. The apparatus as claimed in claim 3, wherein the transparent viewing window is formed in an openable lid of the food chamber.

5. The apparatus as claimed in claim 1, wherein the heating arrangement comprises a first heater for heating the water and a second heater for heating the steam.

6. The apparatus as claimed in claim 5, wherein the circulation system is adapted to circulate a flow past the second heater.

7. The apparatus as claimed in claim 5, further comprising a feed arrangement for providing water from the water reservoir into contact with a heated surface of the first heater.

8. The apparatus as claimed in claim 1, wherein the controller is further adapted to control the heating arrangement such that an initial rise in a temperature of the food chamber to a temperature of 100 degrees Celsius takes less than 2 minutes.

9. A cooking method, comprising:
    receiving food to be cooked in a food chamber;
    heating water from a water reservoir to create steam;
    further heating the steam to create heated steam at a temperature in the range 100 to 120 degrees Celsius; and
    circulating the heated steam around the food chamber,
    wherein the heated steam has an absolute humidity level greater than 450 g/m³, and
    wherein temperature at a surface of the food chamber is maintained above a condensation temperature of the steam.

10. The method as claimed in claim 9, further comprising controlling a delivery of water from the water reservoir to a heating arrangement and controlling the heating arrangement thereby to maintain an environment of the heated steam in the temperature range.

11. The method as claimed in claim 9, comprising heating the water with a first heater and heating the steam with a second heater.

12. The method as claimed in claim 11, comprising circulating the heated steam past the second heater.

13. The method as claimed in claim 9, comprising controlling the heating arrangement such that an initial rise in a temperature of the food chamber to a temperature of 100 degrees Celsius takes less 2 minutes.

* * * * *